United States Patent
Swerdlow et al.

(10) Patent No.: US 9,122,557 B1
(45) Date of Patent: Sep. 1, 2015

(54) USER SETTINGS MANAGEMENT USING EXTERNAL SOURCES

(71) Applicant: GOOGLE INC., Mountain View, CA (US)

(72) Inventors: Andrew Swerdlow, San Francisco, CA (US); Dan Fredinburg, San Francisco, CA (US); Garth Shoemaker, Sunnyvale, CA (US); Michael Eugene Aiello, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/203,154

(22) Filed: Mar. 10, 2014

(51) Int. Cl.
*G06F 9/44* (2006.01)
*G06F 9/445* (2006.01)

(52) U.S. Cl.
CPC ... *G06F 8/65* (2013.01); *G06F 8/71* (2013.01)

(58) Field of Classification Search
CPC ..................................... G06F 8/71; G06F 8/65
USPC .................................................. 717/168, 121
See application file for complete search history.

(56) References Cited

U.S. PATENT DOCUMENTS

| | | | |
|---|---|---|---|
| 6,085,098 A | 7/2000 | Moon et al. | |
| 8,166,406 B1 * | 4/2012 | Goldfeder et al. | 715/745 |
| 8,443,068 B2 | 5/2013 | Lee et al. | |
| 8,460,096 B2 | 6/2013 | Brosnan | |
| 8,464,242 B2 | 6/2013 | Lanner et al. | |
| 2002/0095663 A1 | 7/2002 | Joory | |
| 2007/0167182 A1 * | 7/2007 | Tenhunen et al. | 455/512 |
| 2008/0127084 A1 * | 5/2008 | Sattler et al. | 717/121 |
| 2009/0216864 A1 * | 8/2009 | Salminen | 709/220 |
| 2010/0153468 A1 * | 6/2010 | Lange et al. | 707/802 |
| 2010/0228836 A1 * | 9/2010 | Lehtovirta et al. | 709/220 |
| 2012/0222083 A1 * | 8/2012 | Vaha-Sipila et al. | 726/1 |
| 2013/0013476 A1 * | 1/2013 | Knafelz et al. | 705/35 |
| 2013/0166899 A1 | 6/2013 | Courtney et al. | |
| 2014/0047414 A1 | 2/2014 | Attar et al. | |

FOREIGN PATENT DOCUMENTS

WO 2013/116816 8/2013

OTHER PUBLICATIONS

Damon Armstrong, "Configuration Strategy", 2005.*
Stach, C., et al., Privacy Management for Mobile Platforms—A Review of Concepts and Approaches, IEEE 14th International Conference on Mobile Data Management, 2013, p. 305-313.
International Search Report and Written Opinion for PCT/US2015/019470 dated Jun. 16, 2015, 13 pgs.

* cited by examiner

*Primary Examiner* — Phillip H Nguyen
(74) *Attorney, Agent, or Firm* — Procopio, Cory, Hargreaves & Savitch LLP

(57) ABSTRACT

User settings management using external sources is described, including providing a user interface for a user to configure one or more settings that affect functions of an application; the user interface allows the one or more settings to be manipulated by the user, and allows the one or more settings to be configured based on setting data from a third-party entity; receiving input from the user to configure at least a portion of the one or more settings based on the setting data from the entity; identifying that the setting data from the entity includes the at least the portion of the one or more settings; and configuring the at least the portion of the one or more settings based on the setting data from the entity.

17 Claims, 9 Drawing Sheets

550 →

```
<settings source="http://5.ABC-settings.org/SETTINGS/
2.0.6">
  ...
  <section name="Start Application">
   <setting>
552 {   <id>xyz345690</id>
    <type>radio-button</type>
    <set>ON</set>
   </setting>
   <setting>
554 {   <id>xyz345695</id>
    <type>radio-button</type>
    <set>OFF</set>
   </setting>
   <setting>
556 {   <id>xyz345700</id>
    <type>radio-button</type>
    <set>OFF</set>
   </setting>
  </section >
  ...
</settings>
```

```
<?xml version="1.0" encoding="ISO-8859-1" ?>
<settings>
  ...
  <widget type=list name="Get themes" ID=21255503 default=allowed>
562 {    <option>theme1</option>
    <option>theme2</option>
    <option>theme3</option>
    <option>theme3</option>
  </widget>
```

564 → ...
`<widget type=checkbox name="" ID=21255505>FALSE</widget>`

566 → ...
`<widget type=checkbox name="" ID=21255508>TRUE</widget>`

...
`</settings>`

FIG. 5C

USER SETTINGS MANAGEMENT USING EXTERNAL SOURCES

BACKGROUND

1. Field

The subject matter discussed herein relates generally to software applications and, more particularly, to user settings management using external sources.

2. Related Background

Most, if not all, web-based applications and device-based applications (e.g., applications executing on mobile devices and non-mobile devices, such as computers, machines, etc.) are designed to allow users to configure the applications using parameters or settings. For example, an application may use a setting (e.g., "Auto Connect to Wi-Fi Network") to allow a user Alice to configure or "tell" the application whether Alice prefers the application to automatically connect to a Wi-Fi network if one is available (e.g., by check a box or entering "Yes") or let Alice manually initiate a connection (e.g., by leaving a box unchecked or entering "No"). The application or another application may use a setting (e.g., "Anonymous Commenter") to allow Alice to indicate her privacy preference, such as whether to provide comments to an online platform as "Alice" or as "Anonymous."

A user typically uses many applications or products on more than one device, and many of the applications are connected to the Internet. Many users may not be aware of an application and its functions at a level that allows them to meaningfully configure the settings of the application. Yet, users must make decisions to configure settings of many applications that span across multiple domains. These decisions may have both short and long term impacts.

Often, there are dozens of different options for user settings in an application or product. Each of these settings changes the way a product works in a unique way. Some users, particularly those without experience in software programming, may have a very difficult time knowing which options to choose for one or more given settings, in order for the settings to have their desired experience. Additionally, many of these setting options are added and removed ad-hoc (e.g., by application updates). As a result, users must continuously "watch" their settings to ensure their desired settings remain in effect.

SUMMARY

The subject matter includes methods for user settings management using external sources, including providing a user interface for a user to configure one or more settings that affect functions of an application; the user interface allows the one or more settings to be manipulated by the user, and allows the one or more settings to be configured based on setting data from a third-party entity; receiving input from the user to configure at least a portion of the one or more settings based on the setting data from the entity; identifying that the setting data from the entity includes the at least the portion of the one or more settings; and configuring the at least the portion of the one or more settings based on the setting data from the entity.

The methods are implemented using one or more computing devices and/or systems. The methods may be stored in computer-readable media.

BRIEF DESCRIPTION OF THE DRAWINGS

FIG. 5B shows an example setting data.

FIG. 5C shows another example setting data.

DETAILED DESCRIPTION

The subject matter described herein is taught by way of example implementations. Various details have been omitted for the sake of clarity and to avoid obscuring the subject matter. The examples shown below are directed to structures and functions for implementing user settings management using external sources.

Figure 1:
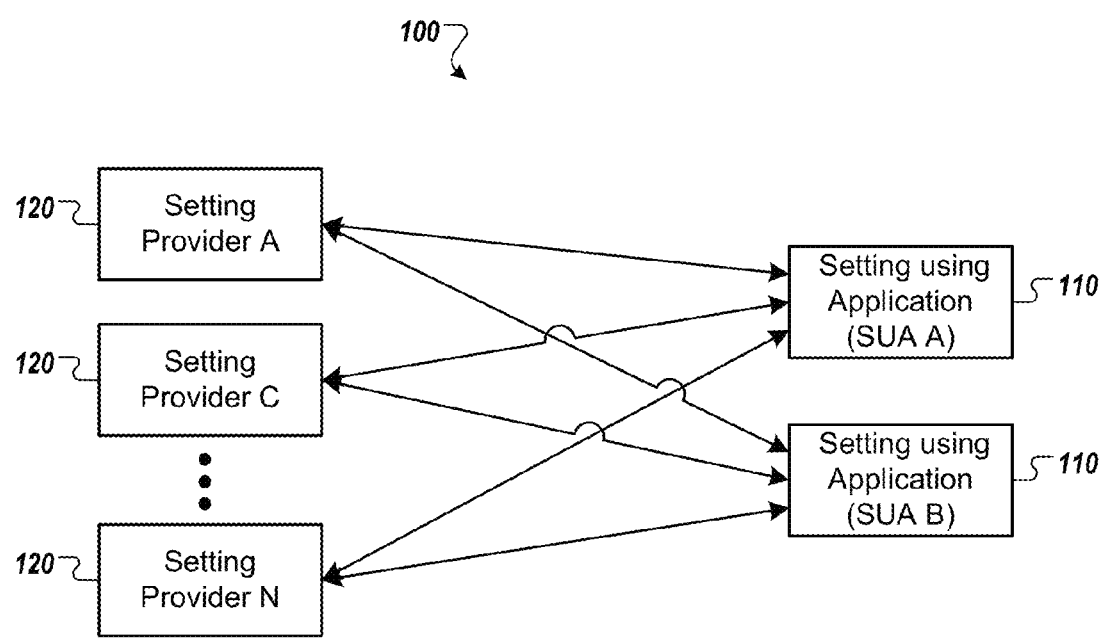
FIG. 1 shows an example application environment according to some example implementations.

FIG. 1 shows an example application environment according to some example implementations. Environment 100 may include any number of applications that are configurable or customizable using parameters, settings, switches, or other preference indicators (collectively referred to as settings). These applications may be referred to as setting-using applications 110 (or SUAs 110).

An "application" or "app" can be any software executing computer readable instructions on a device (device-based application) or an online product or service provided from a system or server (e.g., an app server or web server) and accessed using a device. An application or app may also be referred to as a "product" or "service". The underlying support for an application is hardware, which includes at least one processor of any kind, memory, and/or storage, e.g., non-transitory computer-readable medium.

A setting-using application 110 can be configured manually by users. In addition to and/or in place of manual configuration, a SUA 110 can be configured using a third-party service and/or data. Environment 100 may include any number of third party entities that provide setting services and/or data (e.g., setting providers 120).

As used herein, a "third party" or "third-party entity" refers to a person, organization, company (collectively referred to as entity) that is not the user of a SUA and not the provider of the SUA. For example, if setting provider A 120 also provides SUA A 110 but does not provide SUA B 110, setting provider A 120 is considered a third party with respect to SUA B 110. Setting provider A 120 is considered a second party but not a third party with respect to SUA A 110.

In environment 100, a user (a first party) of SUA B 110 may configure some or all settings of SUA B 110 (the provider of the SUA B 110 being a second party) using service and/or data provided by a setting provider 120 (a third party or third-party entity).

Figure 2A:
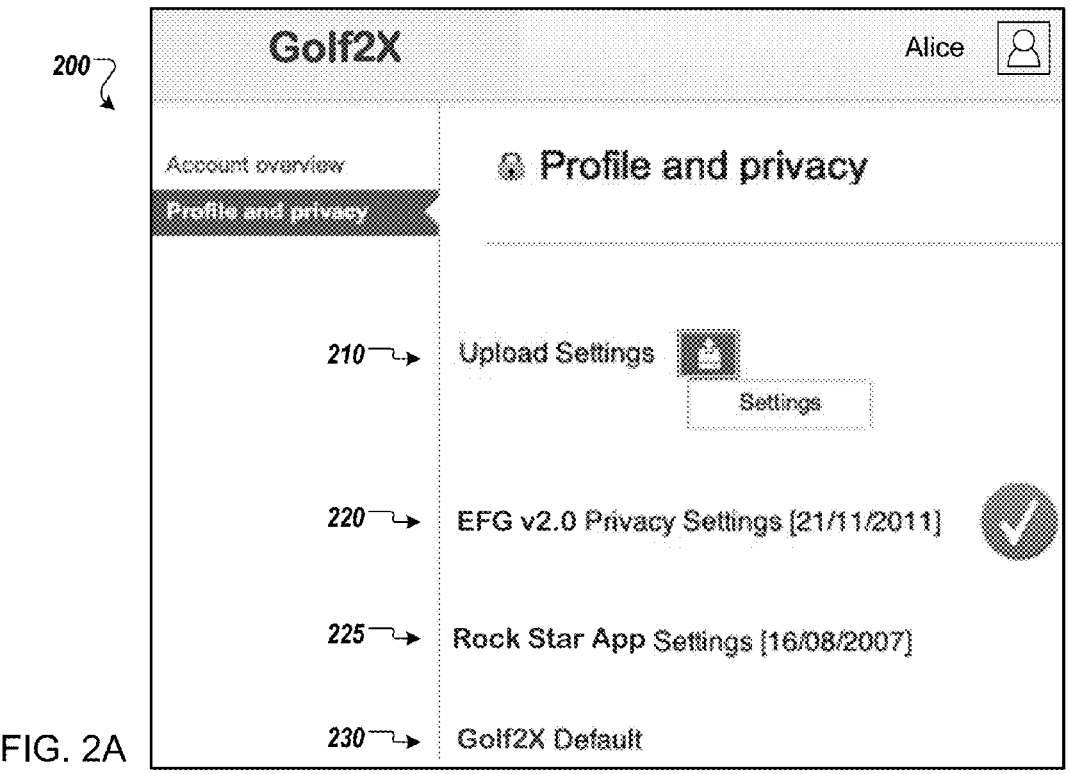
FIG. 2A shows an example setting using application (SUA).

FIG. 2A shows an example setting using application (SUA). For example, SUA 200 may be an application relating to playing golf (e.g., "Golf2X"). SUA 200, shown through an example user interface for managing profile and privacy, may be a web-based application (e.g., a product, service, or application accessed using a web browser) or a device-based application (e.g., an application executed on a computing device, such as a mobile device). SUA 200 or Golf2X may be an application that allows one user or two or more users.

Each user may use one or more settings to configure or customize the application for the user. For example, users Alice and Bob may be users of SUA 200 on the same device or a website. Alice may use settings to configure the functions and/or operations of SUA 200, such as configuring the appearance of SUA 200 (e.g., "skin" of an application), how SUA 200 notifies Alice of the occurrence of an event or condition (e.g., by playing a sound or popping up a message), how long to store usage data and/or history, etc. Alice may also use settings to set the parameters of her privacy preferences. These settings may be referred to as privacy settings.

A privacy setting is any setting that is relating to or affecting Alice as a user. Some examples of privacy settings, which are not limited to the examples discussed herein, include settings that allow users to seclude themselves from other users; control their exposure to online communities or environments; control their information about themselves; control what information the they want to receive and/or what information the they want to share or send out; control who can contact them, see their presence; send them information, and/or share information with them.

According to an example implementation, Bob may use settings to configure SUA 200 to customize the application according to Bob's preferences. A user (e.g., Alice or Bob) may have an "account," which identifies the user. When SUA 200 detects or identifies which user is using the application, settings of that user are used to "customize" the application according to the user's preferences.

Some or all of the settings may be configured using an external source, such as a setting provider that may be a third-party entity. For example, as shown in FIG. 2A, Alice may be provided a user interface with an "Upload Settings" option 210 to identify an external source and upload settings provided by the external source. Upload Settings 210 may provide a list of external sources (not shown) or provide an input box for Alice to enter the external source (e.g., a Universal Resource Locator (URL) of an external source). The external source may provide setting data or information used by SUA 200 to automatically configure its settings based on the setting data. For example, the setting data from an external source (e.g., in Extensible Markup Language (XML) format) may identify which setting is set to which value, parameter, or option. FIGS. 5B and 5C, which are discussed in greater detail below, show examples of setting data.

Continuing to refer to FIG. 2A, after identifying an external source or uploading setting data from an external source, the external source may be kept as a history or for future reference, such as external sources 220 and 225. A timestamp of date may be presented to show when an external source was last uploaded, updated, or used. SUA 200 may include an option 230 for Alice to use SUA 200's default settings. Alice may select, for example, to configures her privacy settings using setting data provided by external source 220 (e.g., version 2.0 of privacy setting data from setting provider EFG). Alice's selection may be indicated, for example, by showing a checkmark to near the selected source. Alice's privacy settings may be configured by, for example, SUA 200 copying the setting data from external source 200 to the privacy settings of SUA 200.

Figure 2B:
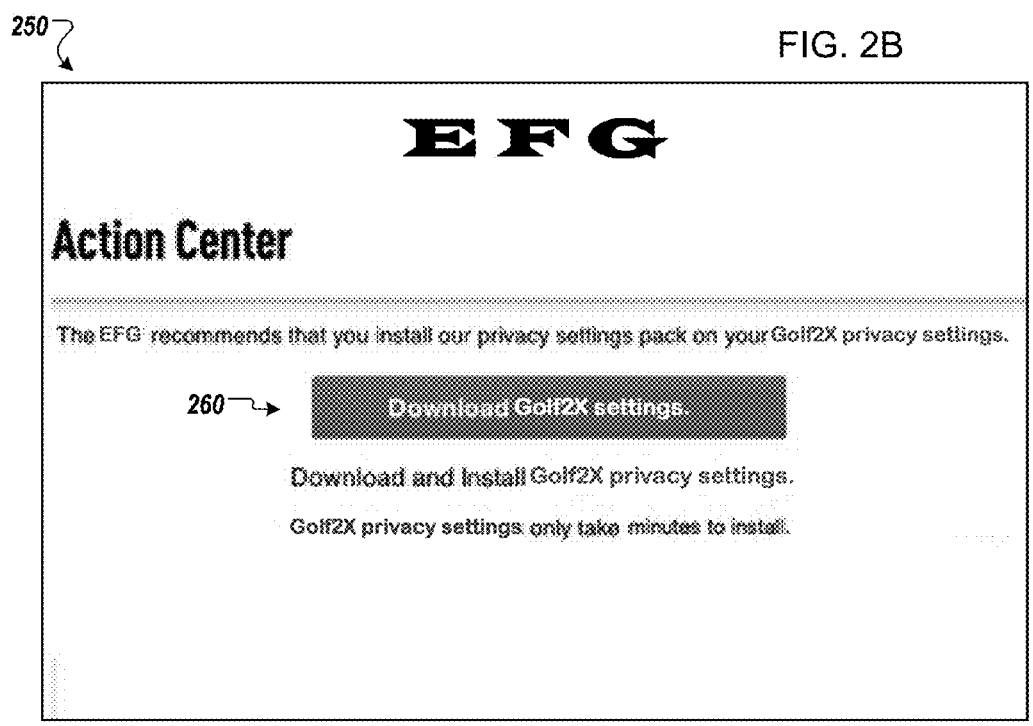
FIG. 2B shows an example setting provider.

FIG. 2B shows an example setting provider. The setting provider 250 is displayed through a user interface used to access, such as download, settings provided by the provider. Setting provider 250 is an external source to an SUA (e.g., SUA 200). Setting provider 250 may be a third-party entity with respect to SUA 200 (i.e., the business entity that owns and/or control setting provider 250 does not provide SUA 200). In FIG. 2A, setting data may be retrieved directly from SUA 200. FIG. 2B shows another example method to retrieve setting data from an external source, e.g., by visiting an external source to download setting data to an application (e.g., SUA 200). Setting data may be retrieved using any method. Another such example implementation is shown in FIG. 3, and is discussed in greater detail below.

Figure 3:
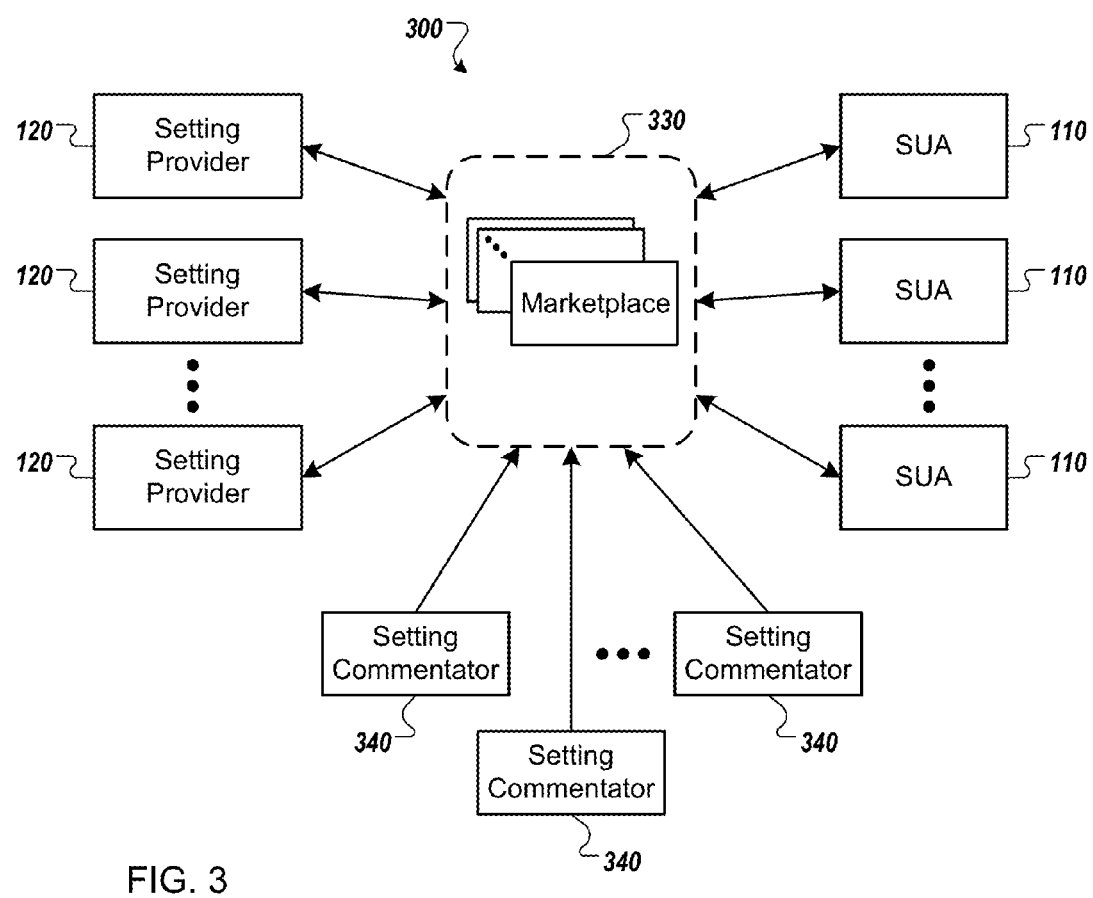
FIG. 3 shows another example application environment according to some example implementations.

FIG. 3 shows another example application environment according to some example implementations. In environment 300, SUAs 110 may be configured using setting data provided by one or more setting providers 120 through one or more intermediaries, such as one or more marketplaces 330.

A marketplace 330 allows for users and organizations to import and export their settings (e.g., as setting data). For example, a marketplace 330 enables organizations or users trusted by various groups of individuals to upload their suggested setting data (e.g., as setting files or configuration files). These trusted organizations or users, as setting providers 120, may provide or upload setting data to one or more marketplaces 330. A marketplace helps users to rely on the expertise of organizations and/or user they trust for the configuration of their application settings, such as privacy settings.

In some example implementations, a marketplace allows for users, as setting commentators 340, to review settings or configurations in the marketplace and provide comments and/or grades for those settings or configurations. Setting commentators 340 may provide comments and/or any feedback to setting configurations or data provided through the marketplace. In some implementations, commentators 340 may rate or grade setting data. A commentator 340 may be any user or organization.

In some example implementations, a commentator may choose to hide his or her identity. In other implementations, a commentator cannot hide his or her identity to ensure that the comment, feedback, rating, etc. is transparent.

Users of SUAs 110 may connect to one or more marketplaces 330 to select setting data from one or more setting providers 120, taking into consideration the comments and rating provided by the commentators 340. For example, Alice may select privacy setting data provided by an organization known for protecting user privacy and/or having received good rating and comments from commentators 340. Setting data may be downloaded to a SUA 110 or a SUA 110 may subscribe to setting data, as described below.

Figure 4A:
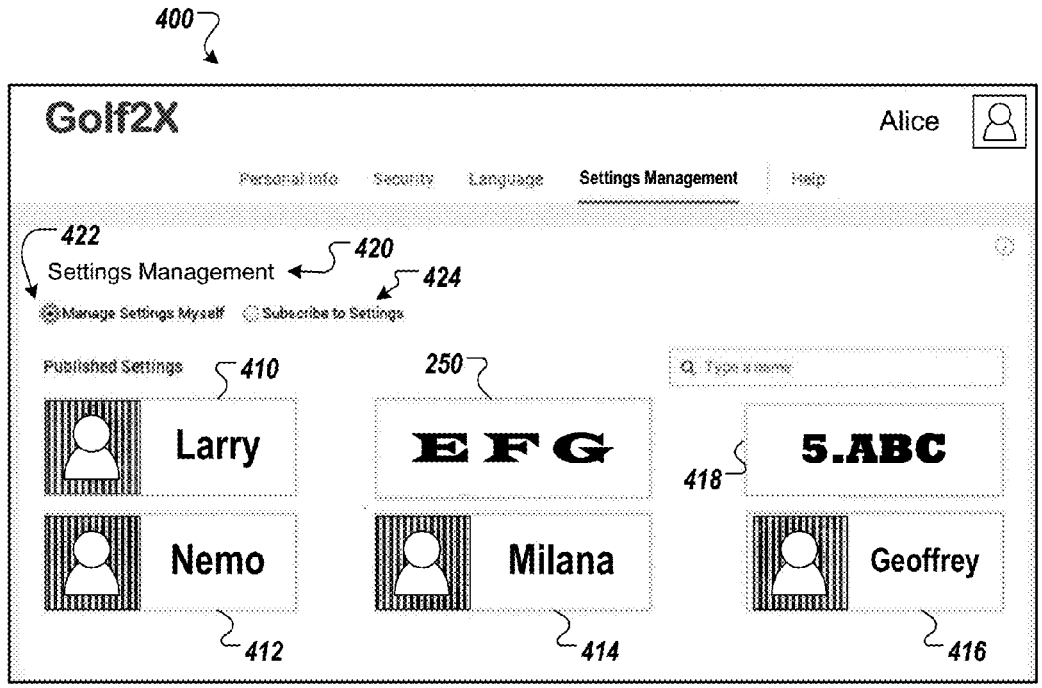
FIG. 4A shows another example setting using application (SUA).

FIG. 4A shows another example setting using application (SUA). SUA 400 may be the same as SUA 200 (FIG. 2) or a different SUA. SUA 400 illustrates an example implementation that allow users to manage settings in more than one way. For example, under "Setting Management" 420, a user is given the choices of "Manage Settings Myself" 422 and "Subscribe to Settings" 424. If the user chooses the "Manage Settings Myself" 422 option, the user may manually configure or set any setting of SUA 400 or leave the setting untouched (e.g., set to the application's default option or set by the user previously).

If the user chooses the "Subscribe to Settings" 424 option, the user may select one of the external sources 250 and 410-418 available in SUA 400 to use to configure some or all of the settings of SUA 400. The external sources 250 and 410-418 may have been previously identified, selected, subscribed to, or download from by the user (e.g., Alice) or another user (e.g., Bob) of SUA 400.

When a user subscribes to a setting provider, the user may subscribe to all the setting data provided by the setting provider or one or more portions of the setting data provided by the setting provider. A setting provider may provide different versions or "flavors" of setting data, such as a "safe browsing" version, a "high performance" version, a "high privacy protection" version, a "public library" version, etc. Versions or flavors may be indicate in any manner, such as using numbers (e.g., v1.2, v2.0, v5.5, 300, etc.). The user may subscribe to one or more versions (e.g., different versions for different sections or groups of application settings).

When a user subscribes to a setting provider, the user subscribes to setting data or one or more versions of setting data for some or all the settings of an application. In an effect, the user is telling or configuring the application to use the subscribed setting data to set the associated settings. For example, Alice subscribes to the setting data of setting provider 250 to configure the privacy settings of application 400. After the subscription, application 400 will automatically use the portion of the setting data of setting provider 250 that are for privacy settings (e.g., the portion is identifiable in some way, such as using setting identifiers) to configure the privacy settings of the application 400 (e.g., copy the setting options of the portion of the setting data to the privacy settings of application 400).

In some example implementations, application 400 may periodically or on demand (e.g., triggered by a user) to check a setting provider to determine whether the subscribed to setting data has been changed or updated. If so, application 400 may automatically update its associated settings accordingly, based on the configuration selected by the user, as described above. A setting provider or a marketplace may also be implemented to notify subscribers of its setting data when updated setting data is available (e.g., the provider or marketplace may keep a record of it subscribers).

The user is not limited to use the external sources 250 and 410-418 available in SUA 400. The user may, for example, visited another setting provider to down its setting data or visit one of the available setting providers (e.g., setting provider 250) to download its latest or updated setting data. The user may identify another setting provider and/or retrieve its setting data from a marketplace (e.g., marketplace 330, FIG. 3).

Figure 4B:
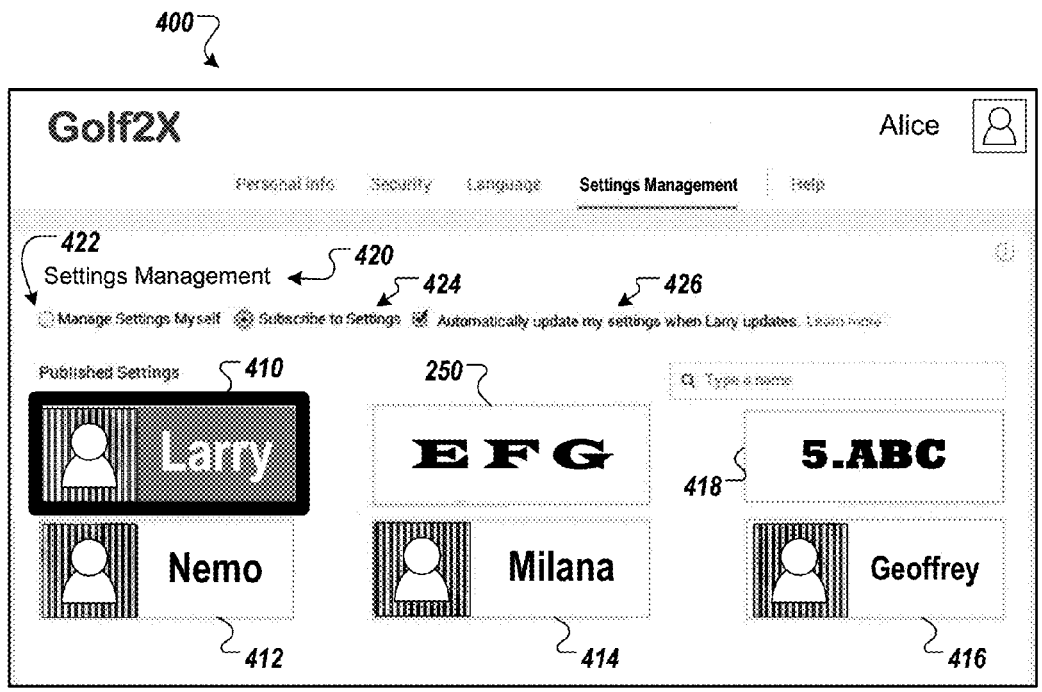
FIG. 4B shows an example variation of the SUA of FIG. 4A.

FIG. 4B shows an example variation of the SUA of FIG. 4A. In the example implementation shown here, SUA 400 includes an "Automatically update my settings when Larry updates" 426. "Larry" in option 426 refers to the currently selected external source 410, as shown with a black box.

As shown and described, many implementations are possible. The example implementations are: (1) allowing a user to manually set or update some or all settings (any portion of the settings) of an application; (2) allowing a user to configure any portion of the settings an application once using setting data from one or more setting providers, and the user may repeat this process any number of times with any setting providers; (3) allowing a user to configure any portion of the settings of an application by subscribing to the setting data of one or more setting providers; the user may be given an option (e.g., in the form of a user interface widget) to indicate that the user wants to be notified when updated setting data is available and/or an option (e.g., in the form of a user interface widget) to indicate that the user confirm or consent to the update, after which application 400 updates the associated settings using the updated setting data; and (4) same as example (3), which is allowing a user to configure any portion of the settings of an application by subscribing to the setting data of one or more setting providers; however, an option (e.g., in the form of a user interface widget) allows the user to indicate that whenever updated setting data is available and detected, automatically update the associated setting in application 400 without notifying the user and without prompting a confirmation or consent from the user. Another variation of example (4) is to just notify the user but without prompting a confirmation or consent from the user. Implementations are not limited to the examples shown and described, and one skilled in the art would appreciate other possible implementations. The example implementations may even be configurable or selectable by using settings (e.g., settings that can only be set manually by a user or an administrator of application 400).

Figure 5A:
FIG. 5A shows an example mapping of application settings to sources.

FIG. 5A shows an example mapping of application settings to setting sources. User interface (UI) 500 is an example UI for mapping the settings of an application (e.g., SUA 400, FIG. 4A or 4B) to sources. For example, Alice may use UI 500 of an application to indicate how the settings of the application are configured (e.g., set by her and/or using setting data provided by one or more setting provider sources). Settings of an application (e.g., SUA 400) may be conceptually classified or grouped in sections, such as sections 510, 520, 530, and 540, as shown. An application may have different, fewer, or more settings that may be presented in different, more, or fewer sections, or no section.

Settings of an application may be mapped to zero, one, or more sources. Different sections of settings or different settings in a section may be mapped to different sources. Mapping one or more settings (mapped settings) to a source (mapped source) means using the mapped source to configure the mapped settings. In the example of UI 500, each section of settings may be mapped to a source. For example, section 510 may be mapped to a source 515 selectable by the user. Settings in sections 520, 530, and 540 may be mapped to sources 525, 535, and 545, respectively; each is selectable by the user.

If the user selects the "Manage Myself" option, such as for source 515, the user is the source (i.e., the user manually sets the settings in section 510 by, in this case, placing checkboxes on selected settings). For the settings in section 520, the user may select the "Copy from" option and identify a setting provider "5.ABC" as the source, from which setting data is copy to the settings in the section. An example of setting data is shown in FIG. 5B. For illustration, sections 530 and 540 show that the user may elect to configure the settings in these sections by subscription (e.g., using the two subscription models described above). The user may select the same setting provider or different setting providers to subscribe to (e.g., "Larry" and "EFG" for sections 530 and 540, respectively). An example of setting data from setting provider "Larry" is shown in FIG. 5C.

FIG. 5B shows an example setting data. Setting data 550 is used to configure, for example, the settings in section 520 (FIG. 5A). For example, settings 521-523 in section 520 may be identified by unique identifiers "xyz345690," "xyz345695," "xyz345700," respectively. When application 400 configures settings 521-523, application 400 may identify and use the setting definition 552, 554, or 556 in setting data 550 to configure settings 521-523. A setting definition is identified or matched to a setting based on the unique identifier of the setting. For example, a setting definition in this example is data between a pair of "<setting>" and "</setting>" tags. Setting definition 552 defines a radio button type of setting having the same unique identifier "xyz345690" as setting 521. Setting definition 552 indicates that this setting is set to "on". Based on the matching identifier "xyz345690", application 400 sets the setting 521 to "ON" (i.e., marked the radio button of setting 521) as defined in setting definition 552. In the same manner, application 400 identifies setting definitions 554 and 556, which have identifiers matching those of setting 522 and 523, to set or configure settings 522 and 523 according to the setting definitions 554 and 556.

FIG. 5C shows another example setting data. Setting data may be encoded in any formats (e.g., text, binary, human readable format, not human readable format, etc.). The formats are not limited to the examples of setting data 500 (FIG. 5B) and setting data 550 (FIG. 5C). Settings 531-533 in section 530 may be identified using any type of identifiers, such as names, labels, numbers, symbols, or any combination thereof. For illustration, the unique identifiers of setting 531-533 are "21255503," "21255505," and "21255508," respectively. These identifiers match those of setting definitions 562-566 of setting data 560. A setting definition may be found anywhere in a setting data file, as illustrated with setting data 560. Based on the identifiers, setting definitions 562-566 are used to configure settings 531-533, as described above. For example, the checkbox of setting 532 is not checked based on the matching setting definition 564 having a value of "FALSE." The checkbox of setting 533 is checked based on the matching setting definition 566 having a value of "TRUE."

Figure 6:
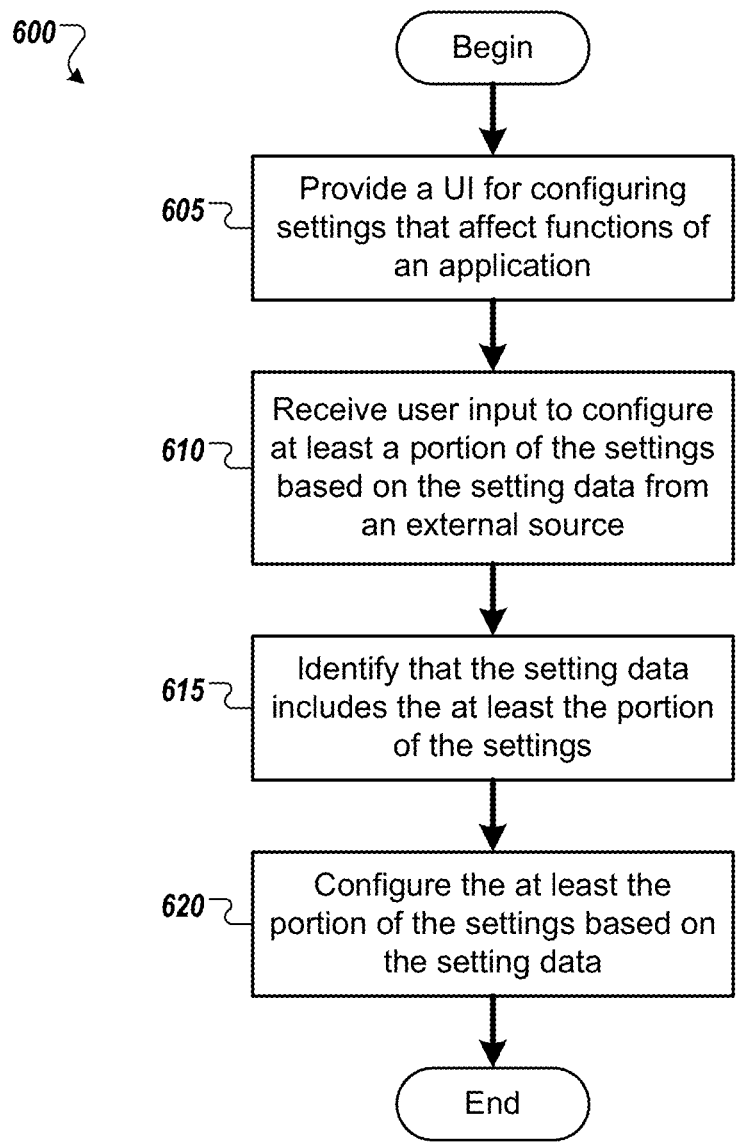
FIG. 6 shows an example of a process implementation.

FIG. 6 shows an example of a process implementation. Process 600 may include operations, such as providing a user interface for a user to configure or set one or more settings that affect functions of an application, at block 605. The user interface allows the settings to be manipulated by the user and/or to be configured based on setting data from one or more third-party entities (e.g., external sources). At block 610, input from the user is received through the user interface to configure one or more settings based on the setting data from at least one third-party entity. At block 610, the application identifies that the setting data from the entity includes, for example, setting definitions for at least some of the settings. For example, the setting definitions may be identifies based on unique identifiers, as described above. At block 620, the application configures the at least some of the settings based on the setting data from the entity (e.g., based on the identified setting definitions).

In some implementations, process 600 may be implemented with different, fewer, or more blocks. Process 600 may be implemented as computer executable instructions, which can be stored on a medium, loaded onto one or more processors of one or more computing devices, and executed as a computer-implemented method.

Figure 7:
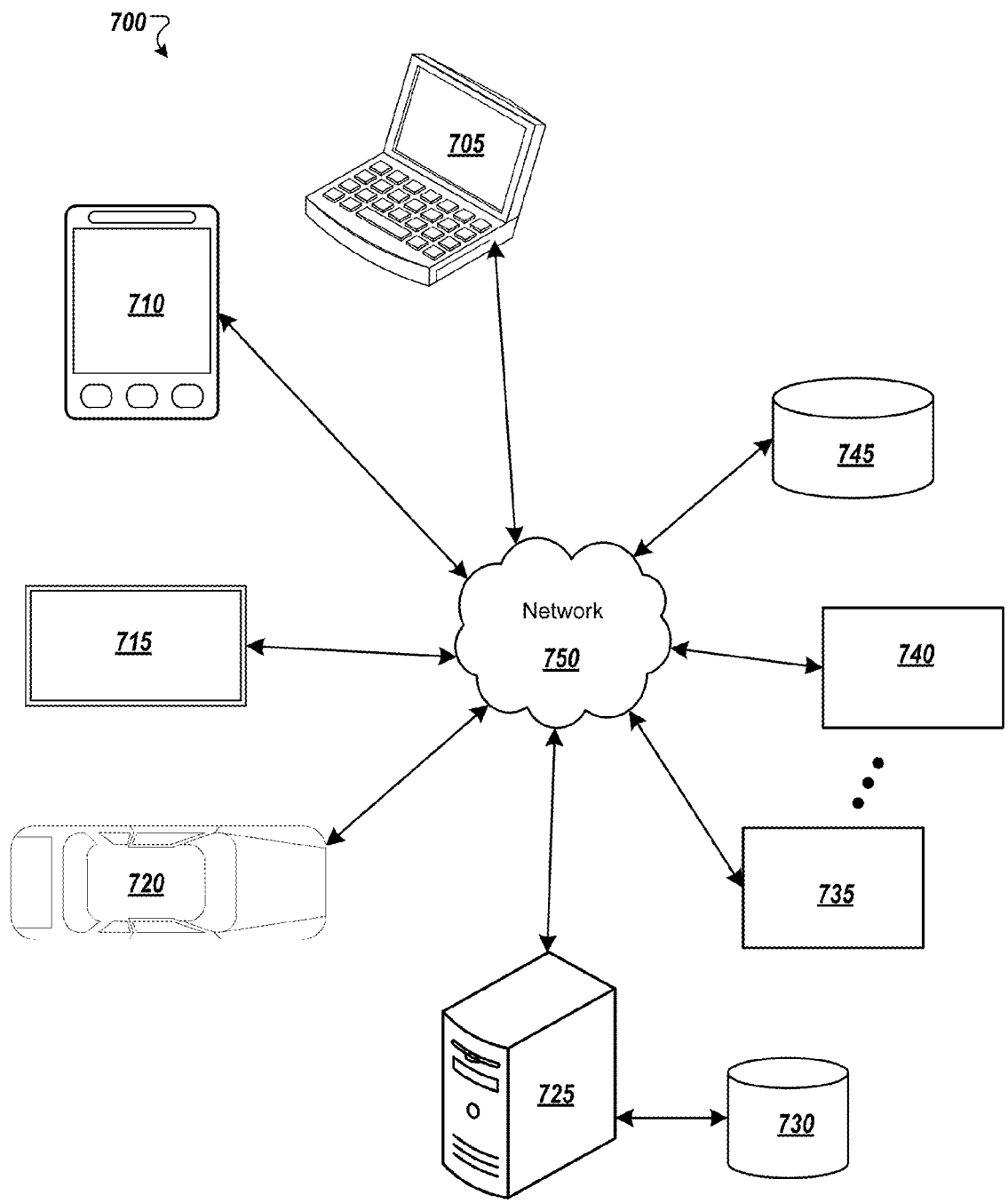
FIG. 7 shows an example environment suitable for some implementations.

FIG. 7 shows an example environment suitable for some implementations. Environment 700 includes devices 705-745, and each is communicatively connected to at least one other device via, for example, network 760 (e.g., by wired and/or wireless connections). Some devices may be communicatively connected to one or more storage devices 730 and 745.

An example of one or more devices 705-745 may be computing device 805 described below in FIG. 8. Devices 705-745 may include, but are not limited to, a computer 705 (e.g., a laptop computing device), a mobile device 710 (e.g., smartphone or tablet), a television 715, a device associated with a vehicle 720, a server computer 725, computing devices 735-740, storage devices 730 and 745.

In some implementations, devices 705-720 may be considered user devices (e.g., devices used by users to run applications or SUAs). Devices 725-745 may be devices associated with service providers (e.g., used by service providers to provide services and/or data, such as setting data).

For example, a user (e.g., Alice) may use a SUA to access, view, and/or share content or a webpage using user device 705 or 710. Alice may configure settings of the SUA using setting data provided by setting providers and/or marketplace provider supported by devices 725-745.

Figure 8:
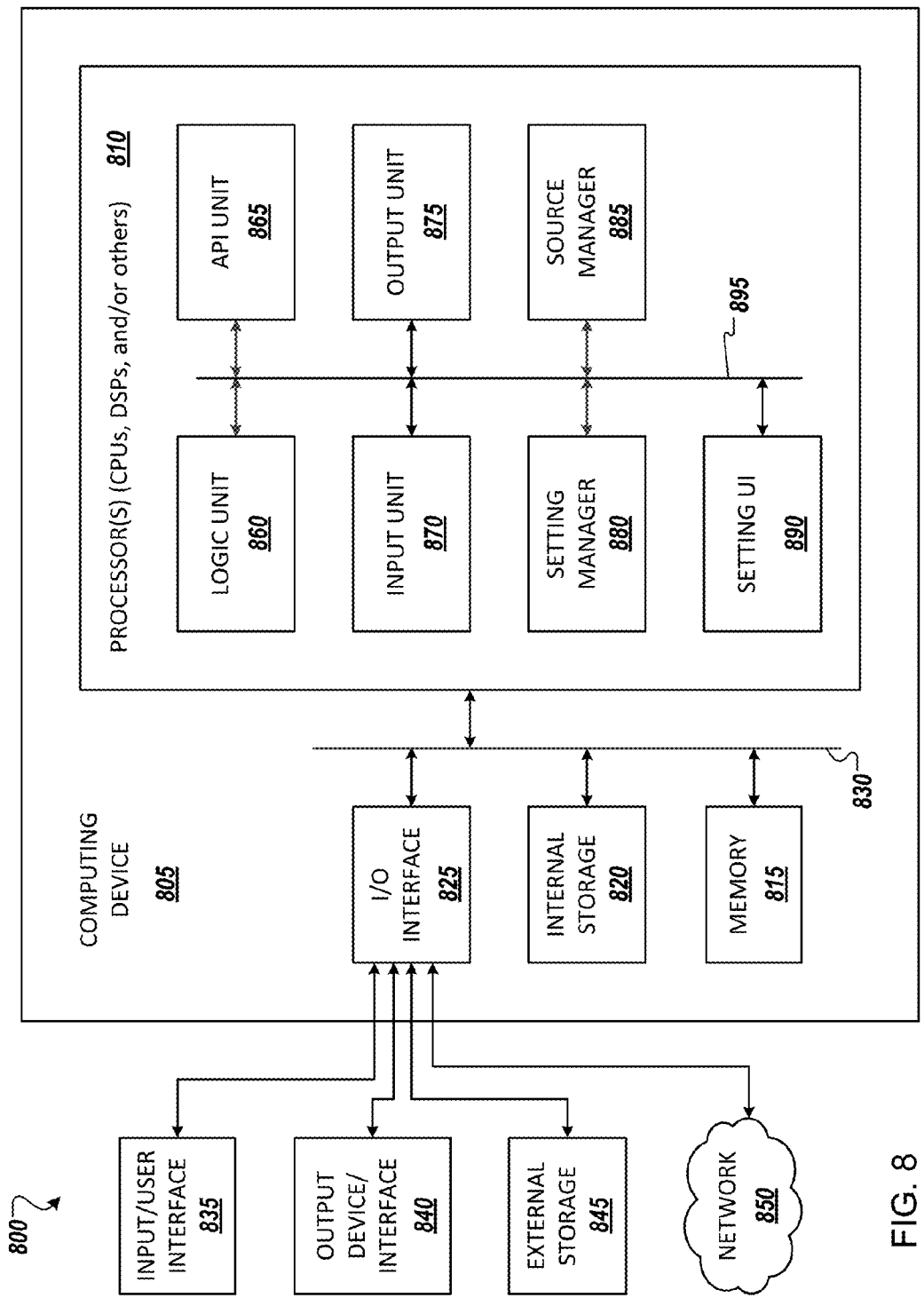
FIG. 8 shows an example computing environment with an example computing device suitable for use in some implementations.

FIG. 8 shows an example computing environment with an example computing device suitable for use in some implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some implementations, input/user interface 835 and output device/interface 840 can be embedded with or physically coupled to the computing device 805. In other example implementations, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, setting manager 880, source manager 885, setting UI 890, and inter-unit communication mechanism 895 for the different units to communicate with each other, with the OS, and with other applications (not shown). For example, setting manager 880, source manager 885, and setting UI 890, along with other units 860-875, may implement one or more processes and/or features shown in FIGS. 1-7. The described units and elements can be varied in design, function, configuration, or implementation and are not limited to the descriptions provided.

In some implementations, when information or an execution instruction is received by API unit 865, it may be communicated to one or more other units (e.g., logic unit 860, input unit 870, output unit 875, setting manager 880, source manager 885, and setting UI 890). For example, when a user of an application (e.g., Alice) wants to configure some settings of the application (e.g., privacy settings), setting UI 890 may present a UI to assist the user (e.g., a UI as shown in FIG. 2, 4A, 4B, 5A, or a different one). After input unit 870 has detected Alice's input, input unit 870 may use API unit 865 to communicate the user input to setting manager 880. setting manager 880 may, via API unit 865, interact with the source manager 885 identify a setting provider and/or retrieve setting data from a setting provider based on Alice's input. setting manager 880 may then be called to configure settings based on the setting data from one or more sources. The configuration is reflected or presented to Alice by setting UI 890.

In some instances, logic unit 860 may be configured to control the information flow among the units and direct the services provided by API unit 865, input unit 870, output unit 875, setting manager 880, source manager 885, and setting UI 890 in some implementations described above. For example, the flow of one or more processes or implementations may be controlled by logic unit 860 alone or in conjunction with API unit 865.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method for configuring an application, comprising:
   providing a user interface for a user to configure one or more settings that affect functions of an application, wherein the user interface allows the one or more settings to be manipulated by the user, and allows the one or more settings to be configured based on setting data from a third-party entity;
   receiving input from the user to configure at least a portion of the one or more settings based on the setting data from the entity, and another input from the user indicating configuring another portion of the one or more settings using setting data from another entity that is not the user;
   identifying that the setting data from the entity includes the at least the portion of the one or more settings, and that the setting data from the another entity includes the another portion of the one or more settings; and
   configuring the at least the portion of the one or more settings based on the setting data from the entity, and the another portion of the one or more settings using the setting data from the another entity.

2. The method of claim 1, wherein the at least the portion of the one or more settings comprises one or more privacy settings.

3. The method of claim 1, wherein the configuring the at least the portion of the one or more settings using the setting data from the entity comprises copying the setting data to the at least the portion of the one or more settings.

4. The method of claim 1, further comprising:
   automatically updating the at least the portion of the one or more settings when the setting data of the entity has changed.

5. The method of claim 4, wherein the automatically updating the at least the portion of the one or more settings is performed after receiving a confirmation associated with the updating from the user.

6. The method of claim 1, wherein the setting data from the entity is received from an online marketplace from which setting data from other entities than the entity can be received, and where the other entities are not the user.

7. The method of claim 1, wherein the setting data from the entity is digitally signed by an entity trusted by the user.

8. A non-transitory computer readable medium having stored therein computer executable instructions for:
   providing a user interface for a user to configure one or more settings that affect functions of an application, wherein the user interface allows the one or more settings to be manipulated by the user, and allows the one or more settings to be configured based on setting data from a third-party entity;
   receiving input from the user to configure at least a portion of the one or more settings based on the setting data from the entity, and another input from the user indicating configuring another portion of the one or more settings using setting data from another entity that is not the user;

identifying that the setting data from the entity includes the at least the portion of the one or more settings, and that the setting data from the another entity includes the another portion of the one or more settings; and configuring the at least the portion of the one or more settings based on the setting data from the entity, and the another portion of the one or more settings using the setting data from the another entity.

9. The computer readable medium of claim 8, wherein the at least the portion of the one or more settings comprises one or more privacy settings.

10. The computer readable medium of claim 8, comprising further computer executable instructions for:

automatically updating the at least the portion of the one or more settings when the setting data of the entity has changed.

11. The computer readable medium of claim 10, wherein the automatically updating the at least the portion of the one or more settings is performed after receiving a confirmation associated with the updating from the user.

12. At least one computing device comprising storage and a processor configured to perform:

providing a user interface for a user to configure one or more settings that affect functions of an application, wherein the user interface allows the one or more settings to be manipulated by the user, and allows the one or more settings to be configured based on setting data from a third-party entity;

receiving input from the user to configure at least a portion of the one or more settings based on the setting data from the entity, and another input from the user indicating configuring another portion of the one or more settings using setting data from another entity that is not the user;

identifying that the setting data from the entity includes the at least the portion of the one or more settings, and that the setting data from the another entity includes the another portion of the one or more settings; and configuring the at least the portion of the one or more settings based on the setting data from the entity, and the another portion of the one or more settings using the setting data from the another entity.

13. The at least one computing device of claim 12, wherein the at least the portion of the one or more settings comprises one or more privacy settings.

14. The at least one computing device of claim 12, wherein the configuring the at least the portion of the one or more settings using the setting data from the entity comprises copying the setting data to the at least the portion of the one or more settings.

15. The at least one computing device of claim 12, wherein the processor is further configured to perform:

automatically updating the at least the portion of the one or more settings when the setting data of the entity has changed.

16. The at least one computing device of claim 15, wherein the automatically updating the at least the portion of the one or more settings is performed after receiving a confirmation associated with the updating from the user.

17. The at least one computing device of claim 12, wherein the setting data from the entity is received from an online marketplace from which setting data from other entities than the entity can be received, and where the other entities are not the user.

* * * * *